May 14, 1935.  P. B. FLANDERS  2,001,096
PRESSURE MEASURING SYSTEM
Filed Feb. 8, 1933

INVENTOR
P. B. FLANDERS
BY
ATTORNEY

UNITED STATES PATENT OFFICE 2,001,096

PRESSURE MEASURING SYSTEM

Paul B. Flanders, East Orange, N. J., assignor to Bell Telephone Laboratories, Incorporated, New York, N. Y., a corporation of New York Application February 8, 1933, Serial No. 655,698

6 Claims. (Cl. 177—351)

This invention relates to fluid pressure measuring systems and more particularly to a device for translating the fluid pressure variations into corresponding current variations to be impressed on suitable indicating or recording mechanisms.

The object of the invention is a precision device adapted to measure pressure variations in the explosion chambers of internal combustion engines.

It has been proposed heretofore, as shown for example in Patent 1,426,735 to W. F. Hendry and C. E. Reddig, August 22, 1922, to measure these pressure variations by means of translating devices connected to the engine cylinders by suitable pipes. There are, however, a number of disadvantages in using an arrangement of this kind. For example, the pipe connections effectively increase the size of the explosion chamber so that calibration is required for each size of chamber to be tested. A more serious objection is that resonant and reflection effects in the pipe connections of prior systems made it very difficult to obtain a true record of the normal engine operation.

In accordance with the general features of this invention, a translating device is directly associated with the explosion chamber without materially changing its size. More specifically, the device comprises a condenser transmitter of rugged design adapted to respond under the severe temperature and pressure conditions existing in the chamber to a frequency range including sound frequencies and extending down to five cycles per second or less. In the preferred structure, the housing is threaded on one end so that it may be readily connected to a test port provided in the cylinder head. The vibratile element is a flat plate terminating the threaded portion and formed integrally with the housing. The electrode is supported in spaced relation to the inner side of the plate and the lead connecting the electrode to the external surface is rigidly mounted to prevent engine vibration from causing changes in the capacity between the lead and the housing.

An important feature of the invention is the proportioning of the transmitter parts to make the device responsive to the unusually low frequencies of these pressure variations. From the standpoint of effective response at low frequencies, the amplifier used with a condenser transmitter should have infinite input impedance but practical considerations, such as sensitivity to extraneous pick-up, make it necessary to limit this impedance to a practical value for any given case. The low frequency response is also proportional to some extent to the capacity and hence the physical size of the transmitter. In sound pick-up transmitters efficiency is an important consideration so that inactive capacity is reduced to a minimum and the total capacity of the device is largely that between the diaphragm and the face of the electrode. In engine testing with a condenser transmitter, the generated voltage is relatively large due to the high gas pressures but the diameter of the vibratile element must be small and the spacing between the plate and the electrode relatively large. Hence the active capacity of the device is small so that if designed along conventional lines the impedance of the input circuit of the amplifier can not be made large enough to make the device responsive at very low frequencies. This difficulty is overcome, according to this invention, by providing sufficient inactive capacity to give the desired low frequency response without excessively reducing the voltage applied to the grid of the first amplifier tube.

The invention will be more clearly understood from the following detailed description and the accompanying drawing in which.

Figure 1:
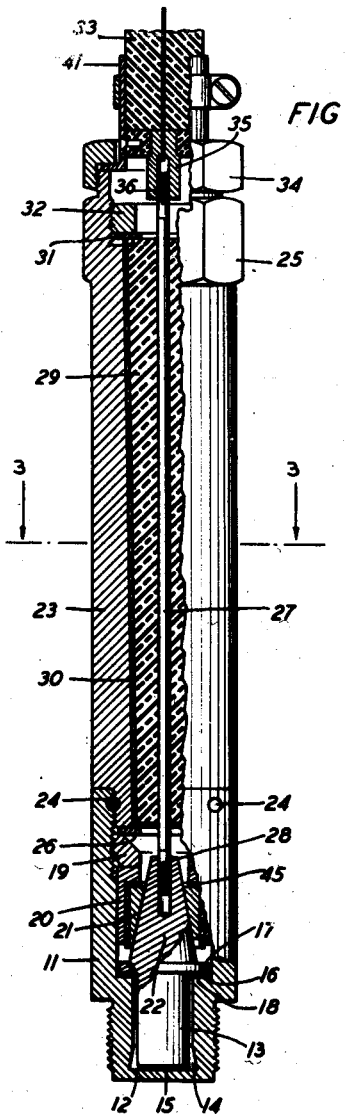
Fig. 1 is a view partly in section of a condenser transmitter according to the invention.
Figure 2:
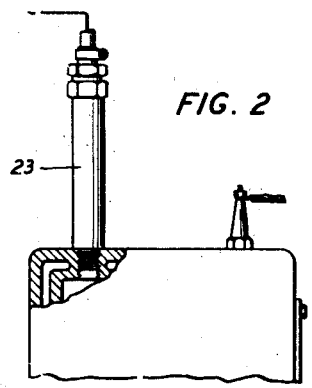
Fig. 2 illustrates the method of using the transmitter for engine testing.

The housing 11 of the transmitter shown in Fig. 1 is preferably turned out from a block of cold rolled steel so that the end plate 12 is integral with the housing thereby avoiding the necessity for a gas-tight joint between the end plate and the other parts of the device. Both sides of the end plate are ground flat and highly polished so that the outer side of the plate presents a heat reflecting surface to the burning gases within the cylinder of the engine and the inner surface of the plate provides a flat vibrating surface so that the electrode 13 may be spaced closely to it without danger of actual contact during the operation of the device. The flexibility of the end plate is increased without making the wall too thin from a heat conducting standpoint by slightly undercutting the wall adjacent the end plate as indicated at 14. A spacing of about ten mils between the face 15 of the electrode and the inner face of the plate is obtained by clamping layers of mica 16 between the shoulder 17 on the electrode and the seat 18 of the housing. This seat is carefully machined to make the clamping surface exactly parallel to the inner side of the plate so that the face 15 of the electrode will be uniformly spaced from the plate over its entire surface. The other end of the electrode is tapered so that when the clamping ring 19 is screwed into place the member 20 exerts pressure through the mica insulation 45 on the ring 21 on the tapered part 22 of the electrode and forces the electrode firmly into position on the seat 18.

Figure 4:
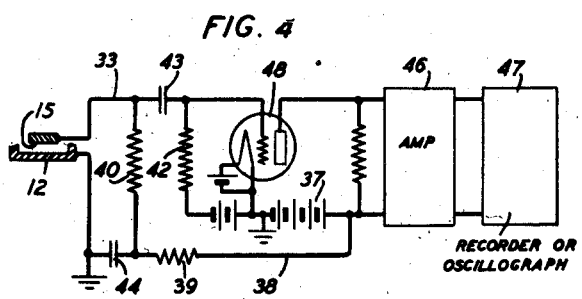
Fig. 4 is a circuit diagram of the transmitter and its associated amplifier and recording or indicating device.
Figure 3:
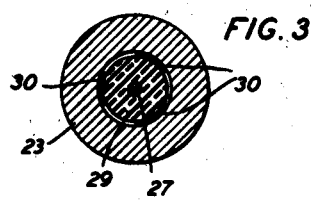
Fig. 3 is a cross section of the housing extension.

For convenience in attaching the device to the engine or other fluid container and disconnecting it therefrom the housing is provided with an extension piece 23 threaded into the housing and secured thereto by tapered dowel pins 24, 24 as indicated. The other end of the housing extension is shaped at 25 to receive an ordinary wrench or other convenient tool for attaching and detaching the transmitter from the engine. To insure a rigid connection between the extension and the housing proper a split washer 26 of the proper thickness is inserted between the extension and the clamping ring 19. Mounted inside the extension piece is a rod 27 having a split end 28 engaging the back of the electrode with a sliding connection and surrounding the rod is a phenol fiber insulator 29 fitting tightly on the rod and conforming to the slight taper of the housing piece 23. To protect this insulator from the excessive heat transmitted from the engine, mica strips 30 are spaced at intervals between the insulator and the housing extension as shown in Fig. 3. A mica washer 31 is also provided between the end of the insulator 29 and the clamping ring 32 which forces the insulator tightly into the housing extension to prevent any vibration of the conductor 27 which would impair the operating characteristics of the device. The cable 33 for connecting the transmitter to its associated amplifier is provided with a cap member 34 having a fitting 35 for terminating the conductor 27 in another sliding connection 36. A polarizing potential of about 200 volts is applied to the electrode 22 from the battery 37 over conductor 38, resistors 39, 40 and cable 33, the housing extension and the shielding 41 of the cable acting as the grounded return circuit in accordance with the usual practice. The circuit of Fig. 4 is essentially a standard transmitter circuit with the exception that the resistance and condenser values are chosen with particular reference to best operating results of this particular transmitter. Resistors 40 and 42 are each about 600 megohms, resistor 39 is 2 megohms, condenser 43 is about 500 micro-microfarads and condenser 44 is 1 microfarad.

The output of the amplifier 46 may be conducted to any desired form of recorder or oscillograph 47 for obtaining a permanent or a visual record of the pressure variations. As already pointed out, the design of this transmitter differs from a conventional condenser transmitter in that instead of proportioning the electrode with respect to the housing for minimum dead capacity, the configuration of the electrode and the space between it and the housing are such as to provide a very high proportion of dead capacity. For the model shown, the active capacity between the face of the electrode and the end plate is of the order of five micro-microfarads while the inactive capacity of the transmitter proper is of the order of one hundred micro-microfarads. The inactive capacity of the conductor within the housing extension is about twenty micro-microfarads and to this is added the capacity of the connecting cable, the value of which will, of course, depend upon the length of cable used between the transmitter and the first vacuum tube of the amplifier. Assuming this cable to be of the order of ten feet in length the total capacity of the transmitter and its cable will be of the order of two hundred micro-microfarads. A transmitter for engine testing work must be kept very small, hence the active capacity of the device can not be made much greater than in the model just described and if the device were proportioned in accordance with conventional designs with a high ratio of active to total capacity it would not be responsive to low frequencies when used with an amplifier of practical design. In the present invention, however, the total capacity has been increased by the deliberate introduction of dead capacity so that when used with coupling resistors of the order of 500 megohms which is near the upper limit of practical amplifier design, the device is practically uniformly responsive to frequencies down to about 5 cycles per second so that it is quite capable of responding to the low frequency pressure variations encountered in this type of work. If desired such a device may be made responsive at somewhat lower efficiency to frequencies below 5 cycles per second by proportioning it to have a still larger amount of dead capacity.

It will be understood that while the invention has been described with reference to its application to the testing of the internal combustion engines that it is equally applicable to other type of engines such as steam engines or to any other systems requiring a measuring device for pressure variations in either liquids or gases. In the model shown the end plate is of the order of 45 mils in thickness but this may be varied in accordance with the pressures and temperatures to be withstood in a given case. In general, the end plate must be strong enough to withstand the temperature and pressure conditions, but resilient enough to vibrate sufficiently to produce practical voltage variations on the grid of the first amplifier tube.

At an assumed maximum working pressure of 1000 lbs. per square inch, the plate of the model described deflects about .0005 inch and gives a voltage variation on the grid of the vacuum tube 48 of about one volt which is approximately the maximum variation applied to the first tube in a sound pick-up system using a condenser transmitter.

What is claimed is:

1. A vibration translating device of the electrostatic type for measuring low frequency variations in high fluid pressures comprising a housing of the order of one inch diameter adapted to be connected directly to the fluid container with the end thereof exposed to the fluid to serve as the vibratile element of the device, and an elongated electrode mounted in and in close spaced relation to the housing with one end in close spaced relation to the element.

2. A vibration translating device of the electrostatic type for measuring variations in high fluid pressures over a frequency range extending to below the range of sound frequencies comprising a housing member adapted to be directly connected to the fluid container, a plate on the housing exposed to the fluid and serving as the vibratile element of the device, and an elongated electrode fixed within the casing in operative relation to the plate and having an inactive capacity with respect to the housing which is large as compared with the capacity between the electrode and the vibratile element.

3. In a vibration translating device for measuring pressure variations in engine cylinders, a housing, one end of which is adapted to be inserted in an engine cylinder, a stiff plate on the cylinder end of the housing forming a closure for the cylinder, an electrode having a high capacity with respect to the housing in spaced relation to the plate, a removable extension piece connected to the housing and a conductor rigidly mounted in said piece and in sliding contact with the electrode.

4. A condenser transmitter for measuring pressure variations in engine cylinders comprising a housing, one end of which is adapted to be inserted in an engine cylinder, a stiff plate on the cylinder end of the housing forming a closure for the cylinder and an electrode within the housing in spaced relation to the plate and proportioned to have a capacity with respect to the housing substantially greater than its capacity with respect to the plate.

5. A condenser transmitter for testing internal combustion engines comprising a housing and an electrode therein, said housing being threaded on one end for insertion in a combustion chamber and having integral therewith an end plate as the vibratile element of the transmitter and said electrode having substantially greater capacity with respect to the stationary housing than with respect to the vibratile element.

6. A condenser transmitter for measuring pressure variations in engine cylinders comprising a housing threaded for insertion in a test port and having integral therewith a stiff end plate as the vibratile element of the transmitter, an elongated electrode within the housing, means for mounting the electrode with one of its ends in spaced relation to the plate, said electrode being so proportioned that its capacity with respect to the housing is of the order of 20 times its capacity with respect to the plate and a conductor rigidly mounted in the housing for connecting the electrode with an external circuit.

PAUL B. FLANDERS.